US012280967B2

(12) United States Patent
Matsuoka et al.

(10) Patent No.: US 12,280,967 B2
(45) Date of Patent: Apr. 22, 2025

(54) ROBOTIC TOOLS AND METHODS FOR OPERATING THE SAME

(71) Applicant: MUJIN, Inc., Tokyo (JP)

(72) Inventors: Shintaro Matsuoka, Tokyo (JP); Hironori Mizoguchi, Tokyo (JP); Rosen Nikolaev Diankov, Tokyo (JP)

(73) Assignee: MUJIN, Inc., Tokyo (JP)

( * ) Notice: Subject to any disclaimer, the term of this patent is extended or adjusted under 35 U.S.C. 154(b) by 0 days.

(21) Appl. No.: 18/661,462

(22) Filed: May 10, 2024

(65) Prior Publication Data

US 2025/0026589 A1    Jan. 23, 2025

Related U.S. Application Data

(63) Continuation of application No. 17/392,108, filed on Aug. 2, 2021, now Pat. No. 11,981,518.

(60) Provisional application No. 63/109,870, filed on Nov. 5, 2020.

(51) Int. Cl.
| | | |
|---|---|---|
| *B25J 9/00* | (2006.01) | |
| *B25J 9/16* | (2006.01) | |
| *B65G 47/91* | (2006.01) | |
| *B65G 67/24* | (2006.01) | |

(52) U.S. Cl.
CPC .......... *B65G 47/917* (2013.01); *B25J 9/1664* (2013.01); *B65G 47/918* (2013.01); *B65G 67/24* (2013.01); *B65G 2203/0233* (2013.01); *B65G 2203/0283* (2013.01); *B65G 2203/0291* (2013.01); *B65G 2203/041* (2013.01)

(58) Field of Classification Search
CPC .... B65G 47/917; B65G 47/918; B65G 67/24; B65G 2203/0233; B65G 2203/0283; B65G 2203/0291; B65G 2203/041; B25J 9/1664
See application file for complete search history.

(56) References Cited

U.S. PATENT DOCUMENTS

| | | | |
|---|---|---|---|
| 11,420,329 B2 | 8/2022 | Wagner et al. | |
| 11,494,575 B2 | 11/2022 | Wagner et al. | |
| 11,981,518 B2 | 5/2024 | Matsuoka et al. | |
| 2007/0282475 A1 | 12/2007 | Schmidt | |
| 2010/0135760 A1* | 6/2010 | Hjornet | B25J 15/0616 348/340 |
| 2013/0233116 A1 | 9/2013 | Rose et al. | |
| 2016/0221187 A1 | 8/2016 | Bradski et al. | |
| 2018/0178379 A1 | 6/2018 | Takeda | |

(Continued)

FOREIGN PATENT DOCUMENTS

| | | |
|---|---|---|
| CN | 108241336 A | 7/2018 |
| CN | 110494258 A | 11/2019 |

(Continued)

OTHER PUBLICATIONS

ISA/KR International Search Report and Written Opinion mailed Feb. 18, 2022 for PCT/US2021/057831 filed Nov. 3, 2021, Applicant: Mujin, Inc., 10 pages.

(Continued)

*Primary Examiner* — Ian Jen
(74) *Attorney, Agent, or Firm* — Perkins Coie LLP

(57) ABSTRACT

A system and method for operating a robotic system to use two or more tools to manipulate objects. The robotic system may coordinate planning processes and/or plan implementations based on grouping the objects.

20 Claims, 8 Drawing Sheets

(56) References Cited

U.S. PATENT DOCUMENTS

2019/0321980 A1 10/2019 Gupta et al.
2019/0359424 A1 11/2019 Avraham
2020/0030977 A1 1/2020 Diankov

FOREIGN PATENT DOCUMENTS

| CN | 111699501 A | 9/2020 |
| JP | 05127722 A | 5/1993 |
| JP | H08174389 A | 7/1996 |
| JP | 2006309577 A | 11/2006 |
| JP | 6444971 B2 | 12/2018 |
| JP | 2022507355 A | 1/2022 |

OTHER PUBLICATIONS

Office Action issued for Japanese patent application No. 2022-501005 mailed Oct. 18, 2022, Applicant: Mujin, Inc., 2 pages.
Decision to Grant issued for Japanese patent application No. 2022-501005 mailed Nov. 4, 2022, Applicant: Mujin, Inc., 3 pages.
Office Action issued for Chinese patent application No. 202210215933.7 mailed Jun. 30, 2023, Applicant: Mujin, Inc., 6 pages.
Decision to Grant issued for Chinese patent application No. 202210215933.7 mailed Oct. 7, 2023, Applicant: Mujin, Inc., 4 pages.

\* cited by examiner

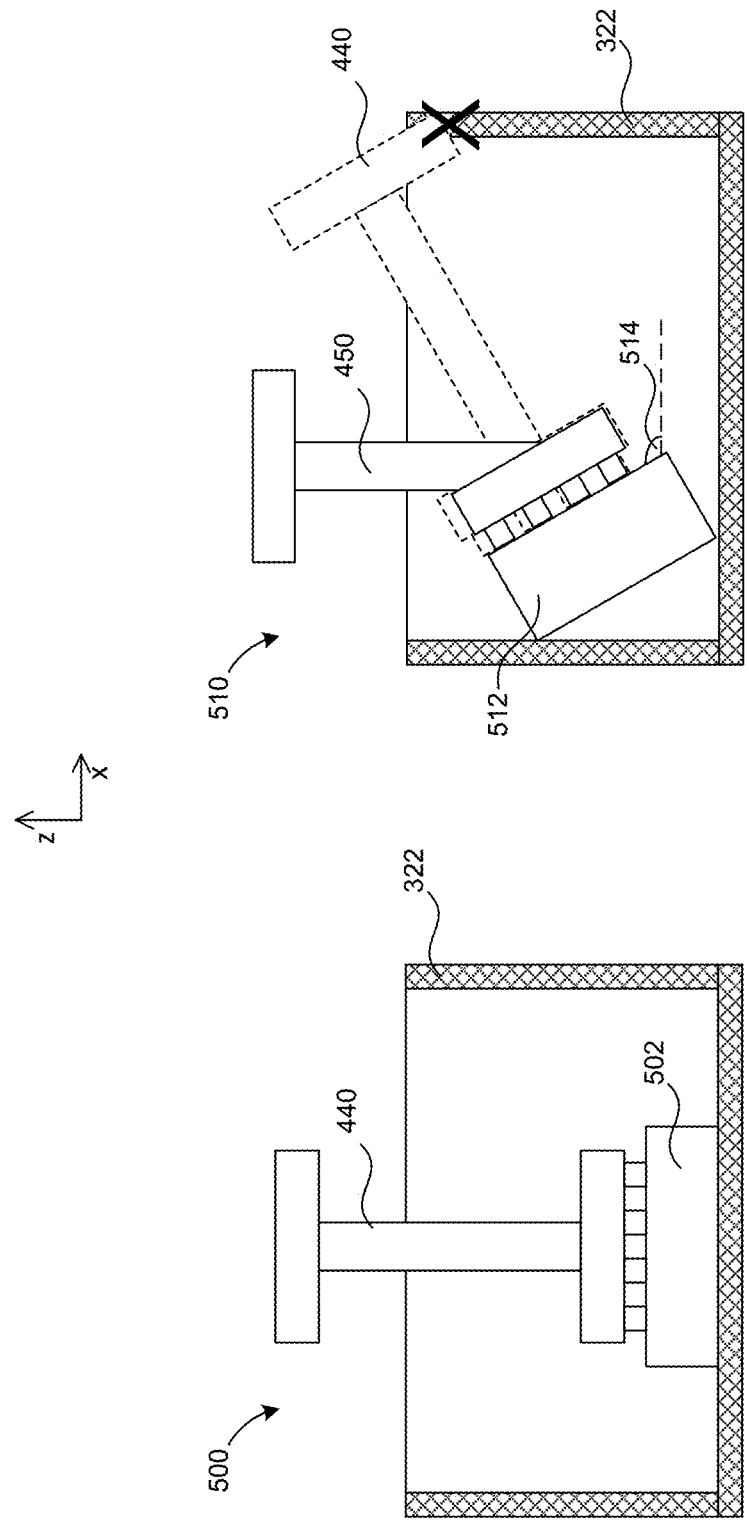

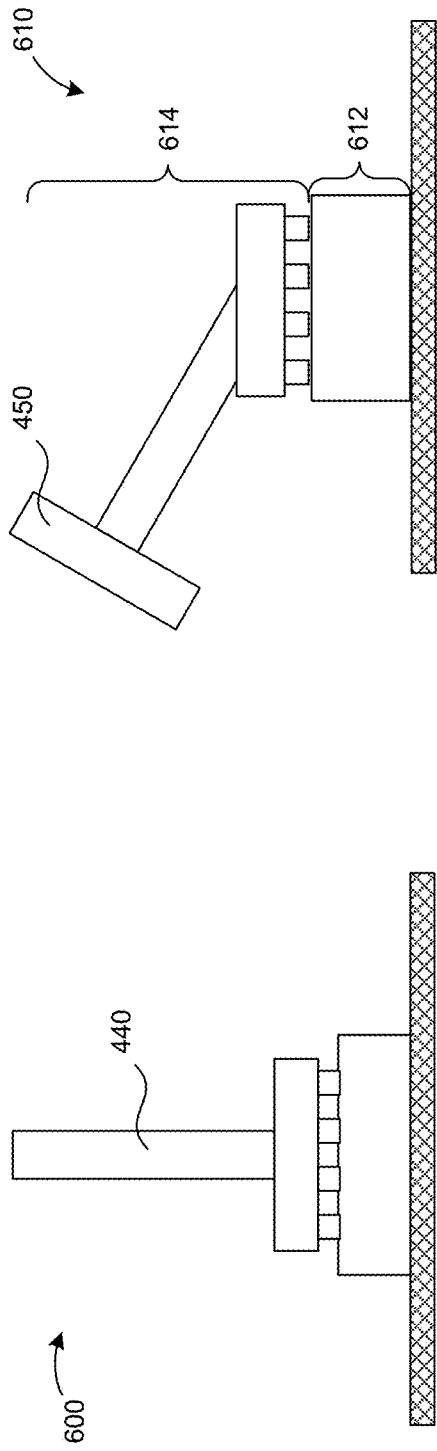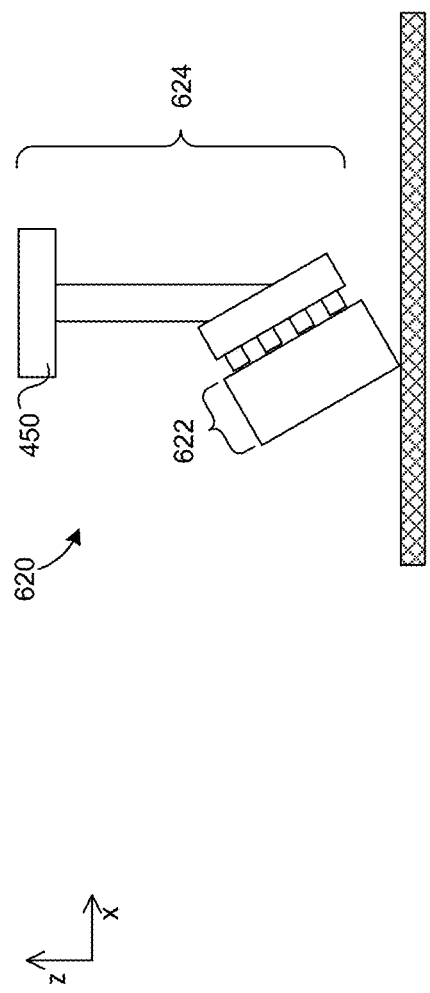

US 12,280,967 B2

ROBOTIC TOOLS AND METHODS FOR OPERATING THE SAME

CROSS-REFERENCE TO RELATED APPLICATIONS

This application is a continuation of U.S. patent application Ser. No. 17/392,108 filed Aug. 2, 2021, now allowed, which claims the benefit of U.S. Provisional Patent Application Ser. No. 63/109,870 filed Nov. 5, 2020, both of which are incorporated herein by reference in its entirety.

TECHNICAL FIELD

The present technology is directed generally to robotic systems and, more specifically, robotic tools configured grasp and hold objects.

BACKGROUND

Robots (e.g., machines configured to automatically/autonomously execute physical actions) are now extensively used in many fields. Robots, for example, can be used to execute various tasks (e.g., manipulate or transfer an object) in manufacturing, packaging, transport and/or shipping, etc. In executing the tasks, robots can replicate human actions, thereby replacing or reducing human involvements that are otherwise required to perform dangerous or repetitive tasks. Robots often lack the sophistication necessary to duplicate human sensitivity and/or adaptability required for executing more complex tasks. For example, robots often have difficulty gripping object(s) in certain sub-optimal locations or poses. Accordingly, there remains a need for improved robotic systems and techniques for transferring objects using a set of gripping tools.

BRIEF DESCRIPTION OF THE DRAWINGS

FIG. 5A is an illustration of a standard grasp scenario in accordance with one or more embodiments of the present technology.

FIG. 5B is an illustration of an angled grasp scenario in accordance with one or more embodiments of the present technology.

FIG. 6A is an illustration of a standard release scenario in accordance with one or more embodiments of the present technology.

FIG. 6B is an illustration of a first angled release scenario in accordance with one or more embodiments of the present technology.

FIG. 6C is an illustration of a second angled release scenario in accordance with one or more embodiments of the present technology.

DETAILED DESCRIPTION

Figure 1:
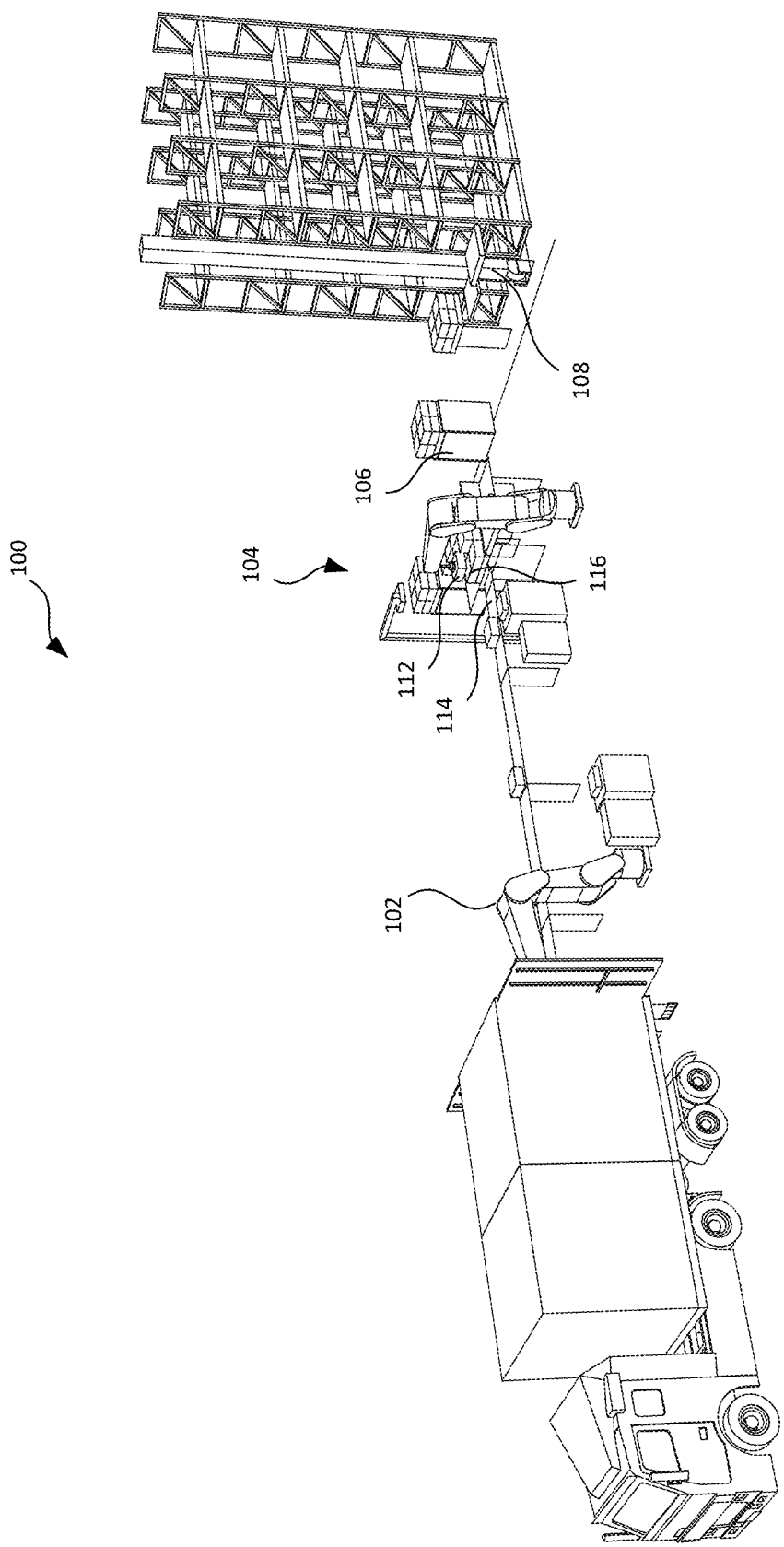
FIG. 1 is an illustration of an example environment in which a robotic system transports objects in accordance with one or more embodiments of the present technology.

Systems and methods for selecting, changing, and using a set of end-effector tools are described herein. For example, a robotic system can include a transport robot configured to selectively connect to an end-effector tool. The robotic system can select and connect to a different end-effector tool to grasp and transfer objects. The robotic system can access and select from a tool set. In some embodiments, the tool set can include a standard fixed tool, a fixed-angle tool, and/or a flexible head tool. The standard fixed tool may have an end-effector rigidly attached to a tool arm. The standard fixed tool can be configured to grip objects having a general orientation or a top surface orthogonal to an orientation of the tool arm. The fixed-angle tool can be configured to have a non-orthogonal angle between the tool arm and a gripper head/interface. The flexible or adjustable head tool can be configured such that the relative angle/orientation between the tool arm and the gripper head/interface can be adjusted according to a pose of the targeted object.

In some embodiments, the robotic system can select the end-effector tool based on simulating and/or planning a transfer of an object according to a selected tool, deriving a measure (e.g., a cost and/or a benefit) for the transfer, compiling a set of plans for a set of targeted objects, and/or selecting a combination/sequence of the plans that optimize the corresponding measures (e.g., a total transfer time and/or an estimated loss/error rate). Additionally or alternatively, the robotic system can implement the selected plan in parallel with a plan derivation for the subsequent object.

The tool set (e.g., a plurality of selectable tools) and/or coordinating plans and usage of the tools for a group of objects (e.g., instead of based on individual object as it is detected) provide decreased resource consumption and/or decreased errors. In some embodiments, the planning and validating process can be completed in a duration (e.g., a second or less) that is shorter than a duration (e.g., one to five seconds) necessary to execute/implement the plan and/ or a duration (e.g., five to ten seconds) necessary to change tools. Accordingly, by planning transfer for a set of multiple objects (e.g., instead of planning for one object at a time), the robotic system can derive a set of plans that minimizes the action with the highest cost (e.g., time/duration), such as the tool change operation.

In the following, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium, including a tangible, non-transient computer-readable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause-and-effect relationship, such as for signal transmission/reception or for function calls), or both.

Suitable Environments

FIG. 1 is an illustration of an example environment in which a robotic system 100 transports objects in accordance with one or more embodiments of the present technology. The robotic system 100 can include and/or communicate with one or more units (e.g., robots) configured to execute one or more tasks. Aspects of the tool selection and usage can be practiced or implemented by the various units.

For the example illustrated in FIG. 1, the robotic system 100 can include an unloading unit 102, a transfer unit 104 (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van and store them in a warehouse or to unload objects from storage locations and prepare them for shipping. For another example, the task can include placing the objects on a target location (e.g., on top of a pallet and/or inside a bin/cage/box/case). As described below, the robotic system can derive plans (e.g., placement locations/orientations, sequence for transferring the objects, and/or corresponding motion plans) for placing and/or stacking the objects. Each of the units can be configured to execute a sequence of actions (e.g., by operating one or more components therein) according to one or more of the derived plans to execute a task.

In some embodiments, the task can include manipulation (e.g., moving and/or reorienting) of a target object 112 (e.g., one of the packages, boxes, cases, cages, pallets, etc., corresponding to the executing task), such as to move the target object 112 from a start location 114 to a task location 116. For example, the unloading unit 102 (e.g., a devanning robot) can be configured to transfer the target object 112 from a location in a carrier (e.g., a truck) to a location on a conveyor belt. Also, the transfer unit 104 can be configured to transfer the target object 112 from one location (e.g., the conveyor belt, a pallet, or a bin) to another location (e.g., a pallet, a bin, etc.). For another example, the transfer unit 104 (e.g., a palletizing robot) can be configured to transfer the target object 112 from a source location (e.g., a pallet, a pickup area, and/or a conveyor) to a destination pallet. In completing the operation, the transport unit 106 can transfer the target object 112 from an area associated with the transfer unit 104 to an area associated with the loading unit 108, and the loading unit 108 can transfer the target object 112 (e.g., by moving the pallet carrying the target object 112) from the transfer unit 104 to a storage location (e.g., a location on the shelves). Details regarding the task and the associated actions are described below.

For illustrative purposes, the robotic system 100 is described in the context of a shipping center; however, it is understood that the robotic system 100 can be configured to execute tasks in other environments/for other purposes, such as for manufacturing, assembly, packaging, healthcare, and/or other types of automation. It is also understood that the robotic system 100 can include other units, such as manipulators, service robots, modular robots, etc., not shown in FIG. 1. For example, in some embodiments, the robotic system 100 can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

The robotic system 100 can include and/or be coupled to physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include transport motors configured to transport the corresponding units/chassis from place to place.

The robotic system 100 can include sensors configured to obtain information used to implement the tasks, such as for manipulating the structural members and/or for transporting the robotic units. The sensors can include devices configured to detect or measure one or more physical properties of the robotic system 100 (e.g., a state, a condition, and/or a location of one or more structural members/joints thereof) and/or of a surrounding environment. Some examples of the sensors can include accelerometers, gyroscopes, force sensors, strain gauges, tactile sensors, torque sensors, position encoders, etc.

In some embodiments, for example, the sensors can include one or more imaging devices (e.g., visual and/or infrared cameras, 2D and/or 3D imaging cameras, distance measuring devices such as lidars or radars, etc.) configured to detect the surrounding environment. The imaging devices can generate representations of the detected environment, such as digital images and/or point clouds, that may be processed via machine/computer vision (e.g., for automatic inspection, robot guidance, or other robotic applications). The robotic system 100 can process the digital image and/or the point cloud to identify the target object 112, the start location 114, the task location 116, a pose of the target object 112, or a combination thereof.

For manipulating the target object 112, the robotic system 100 can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices can include one or more cameras configured to generate images of the pickup area and/or one or more cameras configured to generate images of the task area (e.g., drop area). Based on the captured images, as described below, the robotic system 100 can determine the start location 114, the task location 116, the associated poses, a packing/placement plan, a transfer/packing sequence, and/or other processing results.

In some embodiments, for example, the sensors can include position sensors (e.g., position encoders, potentiometers, etc.) configured to detect positions of structural members (e.g., the robotic arms and/or the end-effectors) and/or corresponding joints of the robotic system 100. The robotic system 100 can use the position sensors to track locations and/or orientations of the structural members and/or the joints during execution of the task.

Robotic Systems

Figure 2:
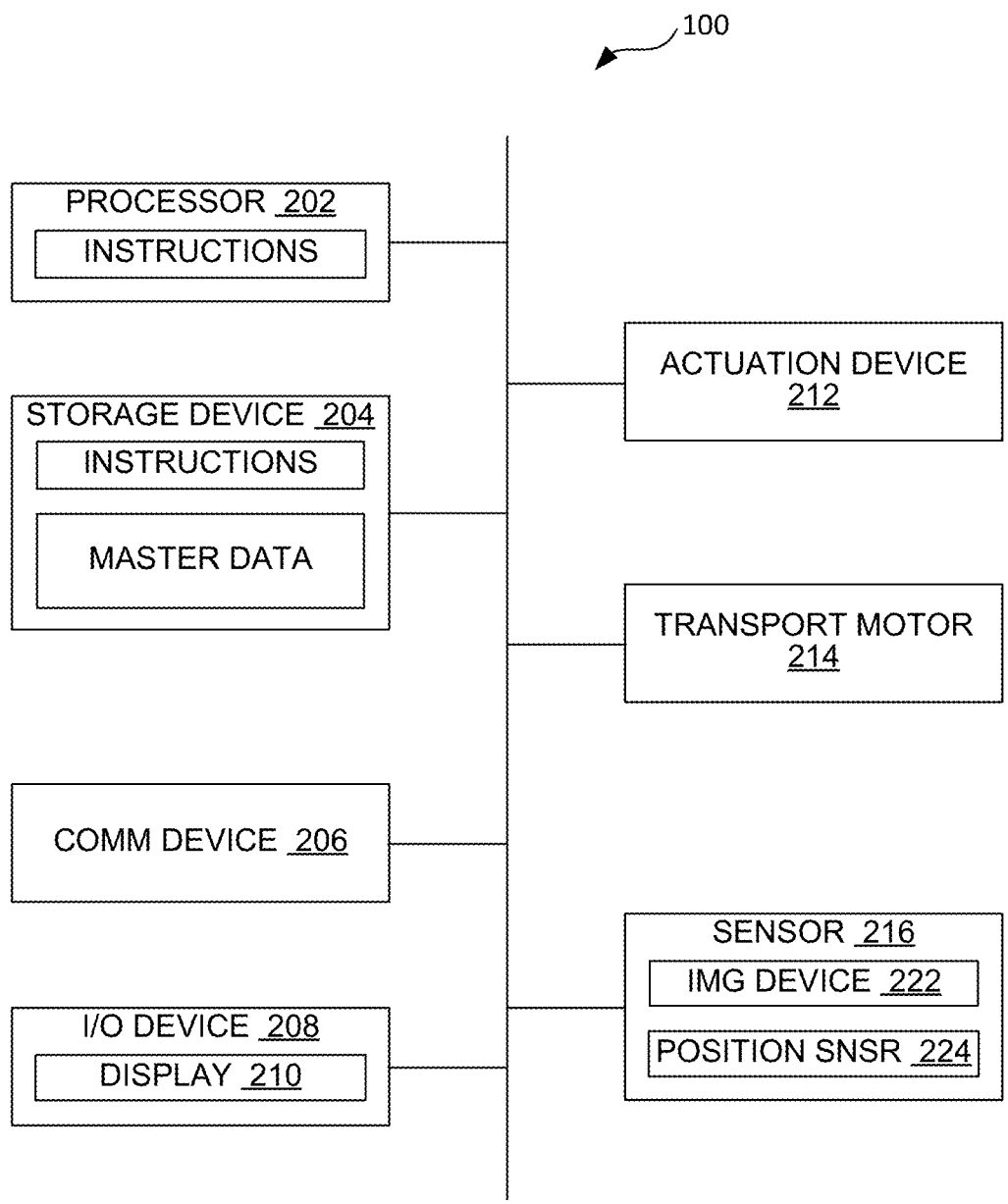
FIG. 2 is a block diagram illustrating the robotic system in accordance with one or more embodiments of the present technology.

FIG. 2 is a block diagram illustrating the robotic system 100 in accordance with one or more embodiments of the present technology. In some embodiments, for example, the robotic system 100 (e.g., at one or more of the units and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include bridges, adapters, processors, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, LTE-M, etc.), and/or other wireless communication protocols.

The processors 202 can include data processors (e.g., central processing units (CPUs), special-purpose computers, and/or onboard servers) configured to execute instructions (e.g., software instructions) stored on the storage devices 204 (e.g., computer memory). In some embodiments, the processors 202 can be included in a separate/stand-alone controller that is operably coupled to the other electronic/electrical devices illustrated in FIG. 2 and/or the robotic units illustrated in FIG. 1. The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM)) and/or non-volatile memory (e.g., flash memory and/or magnetic disk drives). Other examples of the storage devices 204 can include portable memory drives and/or cloud storage devices.

In some embodiments, the storage devices 204 can be used to further store and provide access to processing results and/or predetermined data/thresholds. For example, the storage devices 204 can store master data that includes descriptions of objects (e.g., boxes, cases, and/or products) that may be manipulated by the robotic system 100. In one or more embodiments, the master data can include registration data for each such object. The registration data can include a dimension, a shape (e.g., templates for potential poses and/or computer-generated models for recognizing the object in different poses), a color scheme, an image, identification information (e.g., bar codes, quick response (QR) codes, logos, etc., and/or expected locations thereof), an expected weight, other physical/visual characteristics, or a combination thereof for the objects expected to be manipulated by the robotic system 100. In some embodiments, the master data can include manipulation-related information regarding the objects, such as a center-of-mass (CoM) location or an estimate thereof on each of the objects, expected sensor measurements (e.g., for force, torque, pressure, and/or contact measurements) corresponding to one or more actions/maneuvers, or a combination thereof.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

In some embodiments, a controller (e.g., a separate electronic device) can include the processors 202, the storage devices 204, the communication devices 206, and/or the input-output devices 208. The controller can be a standalone component or part of a unit/assembly. For example, each unloading unit, a transfer assembly, a transport unit, and a loading unit of the system 100 can include one or more controllers. In some embodiments, a single controller can control multiple units or standalone components.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 214 configured to transport the corresponding units/chassis from place to place. For example, the actuation devices 212 and transport motors connected to or part of a robotic arm, a linear slide, or other robotic component.

The sensors 216 can be configured to obtain information used to implement the tasks, such as for manipulating the structural members and/or for transporting the robotic units. The sensors 216 can include devices configured to detect or measure one or more physical properties of the robotic system 100 (e.g., a state, a condition, and/or a location of one or more structural members/joints thereof) and/or of a surrounding environment. Some examples of the sensors 216 can include contact sensors, proximity sensors, accelerometers, gyroscopes, force sensors, strain gauges, torque sensors, position encoders, pressure sensors, vacuum sensors, etc.

In some embodiments, for example, the sensors 216 can include one or more imaging devices 222 (e.g., visual and/or infrared cameras, 2-dimensional and/or 3-dimensional imaging cameras, distance measuring devices such as lidars or radars, etc.) configured to detect the surrounding environment. The imaging devices 222 can include cameras (including visual and/or infrared cameras), lidar devices, radar devices, and/or other distance-measuring or detecting devices. The imaging devices 222 can generate representations of the detected environment, such as digital images and/or point clouds, that may be processed via machine/computer vision (e.g., for automatic inspection, robot guidance, or other robotic applications).

For manipulating the target object 112, the robotic system 100 (e.g., via the various circuits/devices described above) can capture and analyze an image of a designated area (e.g., a pickup location, such as inside the truck or on the conveyor) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices 222 can include one or more cameras configured to generate images of the pickup area and/or one or more cameras configured to generate images of the task area (e.g., drop area). Based on the captured images, as described below, the robotic system 100 can determine the start location 114, the task location 116, the associated poses, a packing/placement plan, a transfer/packing sequence, and/or other processing results.

In some embodiments, for example, the sensors 216 can include position sensors 224 (e.g., position encoders, potentiometers, etc.) configured to detect positions of structural members (e.g., the robotic arms and/or the end-effectors) and/or corresponding joints of the robotic system 100. The robotic system 100 can use the position sensors 224 to track locations and/or orientations of the structural members and/or the joints during execution of the task. The robotic system 100 can use the detected positions, tracked locations, tracked orientations, etc. from the sensors 216 to derive tracking data that represents a current and/or a set of past locations for the target object 112 of FIG. 1 and/or the structural members.

Figure 3:
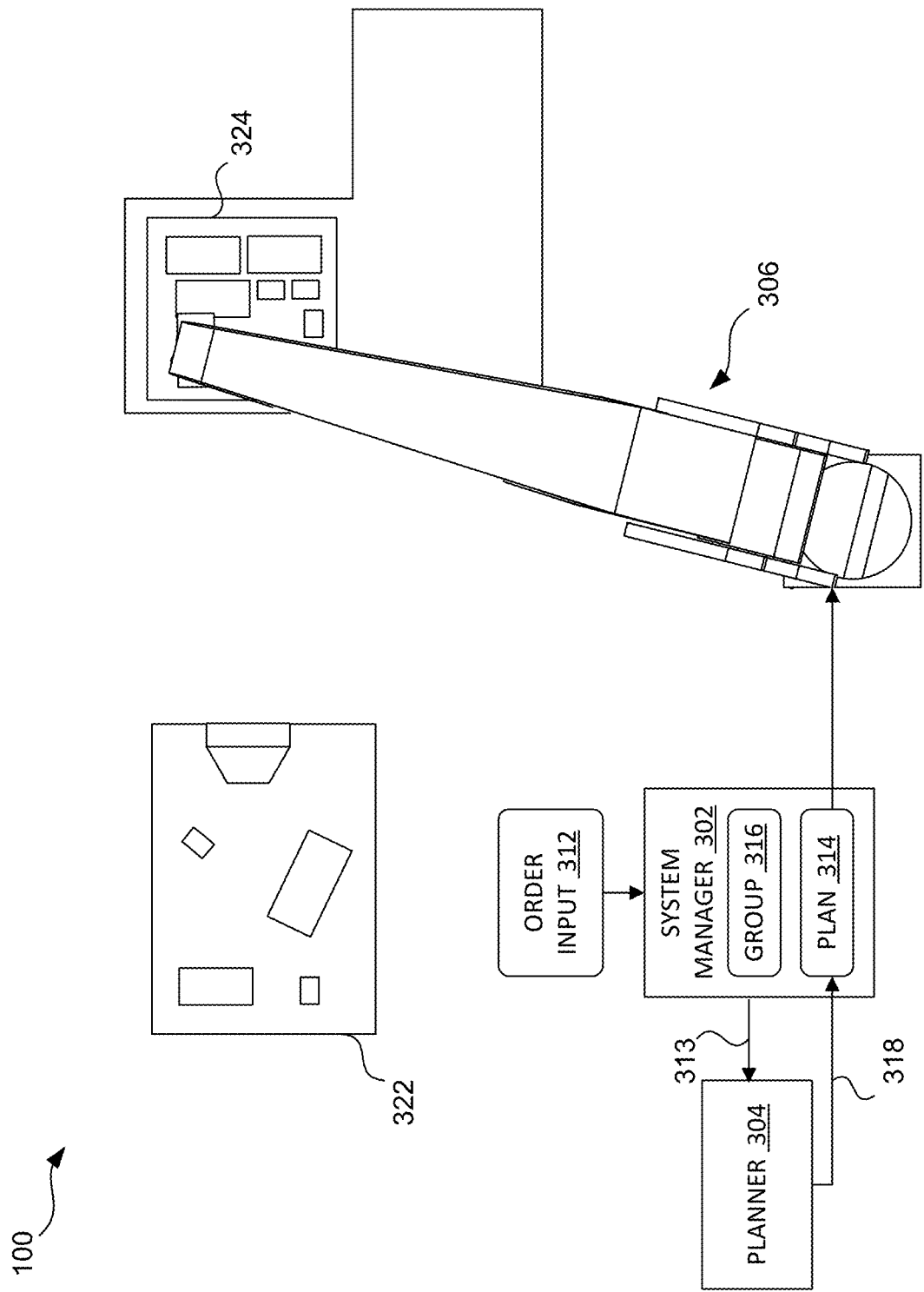
FIG. 3 is a top view of the robotic system in accordance with one or more embodiments of the present technology.

FIG. 3 is a top view of the robotic system 100 in accordance with one or more embodiments of the present technology. In some embodiments, the robotic system 100 can include a system manager 302, a planner 304, and/or a robotic arm 306. The system manager 302 and/or the planner 304 can be implemented or include one or more circuits illustrated in FIG. 2 (e.g., the processors 202, the storage devices 204, the communication devices 206, etc.).

The system manager 302 can include a mechanism (e.g., a device and/or a software application) configured to manage an overall operation of one or more task stations and/or corresponding robotic units. For example, the system manager 302 can include a facility management system, such as for a warehouse or a shipping hub. In managing the overall operation, the system manager 302 can receive an order input 312 (e.g., a customer request for a set of objects accessible by the robotic system 100). The system manager 302 can derive various tasks, interactions/controls between task stations and/or corresponding robots, associated sequences or timings, and the like to gather the objects listed in the order input 312. The system manager 302 can further interact with the robotic arm 306 to implement/execute a task.

The planner 304 can include a mechanism (e.g., a device, a software application/feature, or a combination thereof) configured to derive detailed controls for operating one or more robots or components therein. The planner 304 can derive the detailed steps, such as motion plans for robots and/or communication protocols or sequences with other subsystems, to operate the one or more robotic units and accomplish the tasks determined by the system manager 302.

For operating the robotic arm 306, the robotic system 100 can use the planner 304 to derive a transfer plan 314 that corresponds to a path for moving one or more items from the start location 114 of FIG. 1 to the task location 116 of FIG. 1. For example, the robotic system 100 can obtain one or more images of the start location 114 and the task location 116 via the imaging devices 222 of FIG. 2. The robotic system 100 can process the images to identify or recognize the ordered objects and/or their poses within the bin (e.g., a container having at least two vertical walls) at the start location 114. Similarly, the robotic system 100 can use the images of the task location 116 to derive or identify a placement location for each of the target objects at the start location 114. The planner 304 can derive the transfer plan 314 that includes the path and/or the corresponding commands, settings, timings, etc. for operating the robotic arm 306 (e.g., the actuation device 212 of FIG. 2 and/or the transport motor 214 of FIG. 2 thereof) to transfer the target objects between the corresponding locations. In some embodiments, the planner 304 can iteratively derive the transfer plan 314 by starting from the placement location and iteratively deriving a next incremental position in moving toward the destination. The next incremental position can be a tested position that satisfies one or more predetermined rules, such as for avoiding collisions, minimizing distance/time, or the like.

The robotic system 100 can implement the transfer plan 314 and operate the robotic arm 306 accordingly to transfer the one or more target objects identified in the order input 312. For example, the system manager 302 can interact with the robotic arm 306, such as by communicating the path and/or the commands/settings of the transfer plan 314 to the robotic arm 306. The robotic arm 306 can execute the received information to perform the task.

As an illustrative example, the system manager 302 can interact with one or more robots (e.g., transport units, such as automated guided vehicles (AGVs), conveyors, etc., and/or subsystems) to access from storage areas containers (including, e.g., a start bin 322) having the ordered objects stored therein. Accordingly, the robotic system 100 can operate the transport units to transport the start bin 322 to the start location 114 for the robotic arm 306. Similarly, a target container 324 (e.g., a packaging box or a destination bin) may be placed at the task location 116 for the robotic arm 306. Alternatively, the task location 116 can correspond to a drop or placement location on a conveyor or a robot (e.g., AGV). Once the start location 114 and the task location 116 are ready, the system manager 302 can interact with the robotic arm 306 according to the transfer plan(s) 314. Accordingly, the robotic arm 306 can grasp the target object(s) 112 (e.g., one or more of the objects specified in the order input 312) and transferring it/them from the start location 114 to the task location 116. For example, the robotic arm 306 can pick the ordered objects from the start bin(s) 322 at the start location 114 and place them in the target container(s) 324 and/or the designated locations at the task location 116 to fulfill the order.

In some embodiments, the robotic system 100 can utilize a set of tools (e.g., specialized end-effectors) to perform different tasks using the same robot and/or improve the performance of a given task. For example, the robotic system 100 can selectively connect the robotic arm 306 to a gripper, a welder, or a cutter to perform corresponding functions according to the assigned task. Also, the robotic system 100 can selectively connect the robotic arm 306 to a pincher gripper or a vacuum gripper according to physical characteristic of the targeted objects and/or their surrounding environment (e.g., relative locations of other objects, availability of approach paths, etc.).

In some embodiments, as described in detail below, the robotic system 100 can selectively connect the robotic arm 306 to grippers having different angled interfaces according to the target object poses. For example, the robotic system 100 can select a first tool when the target object is positioned flat on the bottom of the bin, presents a relatively horizontal top surface, and/or relatively vertical peripheral surfaces. Alternatively, the robotic system 100 can select a second tool when the target object has an angled pose relative to a lateral plane, such as when the targeted object has non-parallel surfaces or is placed on top of uneven or non-planar contact points. The second tool can include contact or grip interfaces configured to grasp such angled objects.

In utilizing the set of tools, the system manager 302 can provide a target selection 313 to the planner 304 to identify the tool and/or the target object 112 selected for one or more of the tasks/objects. The planner 304 can derive the transfer plan 314 according to the target selection 313 and a feedback 318 accordingly. For example, the feedback 318 can include the transfer plan 314 for transferring the targeted object with the specified tool when the derivation is successful (e.g., meets one or more threshold conditions, such as for avoiding collision or satisfying a minimum error estimate). The feedback 318 can include an error message when the derivation is unsuccessful, such as when the specified tool is inappropriate (by, e.g., causing collision events) for grasping and/or transferring the targeted object. In alternative embodiments, the planner 304 can select the tool and derive the corresponding transfer plan 314 without interacting with the system manager 302 regarding the tool selection.

When multiple tools are available, the robotic system 100 can derive and evaluate multiple tasks or actions as a single set instead of processing each task or action separately. Alternatively or additionally, the robotic system 100 can coordinate the sequence or timing between the derivation/evaluation, tool change, and plan implementation to improve or maximize the efficiency (e.g., overall completion time) for the set of tasks. Since the derivation process, the tool changing process, and the implementation of the action have different costs and benefits, deriving and evaluating the separate tasks and actions as a set can provide improvements in the overall performance. For example, a duration necessary to derive and evaluate the transfer plan 314 (e.g., one second or less) can be less than a duration required to change tools (e.g., five seconds or more) and/or less than a duration required to implement the plan at the robotic arm 306 (e.g., one to five seconds). In some embodiments, changing tools can take longer than an average or maximum duration necessary to complete transfer of one item.

To derive and evaluate a set of tasks, the robotic system 100 (e.g., the system manager 302 and/or the planner 304) can determine tool-based object groupings 316 that identify or group items according to the tool appropriate for their manipulations. For example, the robotic system 100 can derive the tool-based object groupings 316 based on the poses (using, e.g., angles or orientations of exposed surfaces relative to one or more predetermined horizontal/vertical lines or planes) of targeted objects within the start bin 322. The robotic system 100 can evaluate different sequences or combinations of the transfer plans 314 according to a set of predetermined rules that account for the cost of changing and utilizing the tool. In one or more embodiments, the robotic system 100 can calculate a cost, such as an estimated transfer time and/or an estimated error probability, associated with each transfer plan 314. The robotic system 100 may eliminate any transfer plans that cause collision and/or have error probabilities (e.g., loss likelihood) exceeding a predetermined threshold as described above, and thus determine plans that use the appropriate tools to grasp the objects. The robotic system 100 can derive different sequences of the determined set of plans and include or plan for the tool change operations accordingly. For each sequence, the robotic system 100 can calculate the overall cost metric (e.g., an overall completion time or an estimated completion time that accounts for a likely error rate) for evaluation. For implementation, the robotic system 100 can select the sequence that minimizes the overall cost metric.

In some embodiments, the robotic system 100 can improve the overall performance of the tasks by controlling the timing and parallel implementations of the planning, tool change, and implementation of the plan. For example, the robotic system 100 can identify the tool already attached to the robotic arm 306 when the objects are identified or when the start bin 322 is placed at the start location 114. The robotic system 100 can identify a first group of targeted objects that can be grasped with the existing tool. The robotic system 100 can select one of the objects in the group and derive the corresponding plan. Once the first plan is complete, the robotic system 100 can implement the first plan in parallel to derivation of the second plan in the group. When the planning for the first group of objects are complete, the robotic system 100 can derive the plans for the second group of objects in parallel to (e.g., concurrently/ simultaneously with) implementations of the first set of plans and/or the tool change operation.

In other example embodiments, the system manager 302 can identify the initial tool already attached to the robotic arm 306. The system manager 302 can interact with the planner 304 to identify and plan for a first object that can be grasped and transferred using the attached tool. During implementation of the first plan, the system manager 302 can interact with the planner 304 to plan for a second object. When the derivation fails, the system manager 302 can select and interact to plan for different objects in an iterative manner in parallel to implementation of the preceding plan. When the derivation is successful for the existing tool, the corresponding object and the plan can be implemented next. When none of the remaining target objects are appropriate for the currently connected too, the robotic system 100 can plan for implementing the tool change operation at the end of the ongoing or preceding implementation of the plan. In alternative embodiments, the robotic system 100 can derive and evaluate feasibility and costs of all available tools for each targeted object. The robotic system 100 can analyze the full set of derivations in determining the preferred sequence.

Example Tools

Figure 4B:
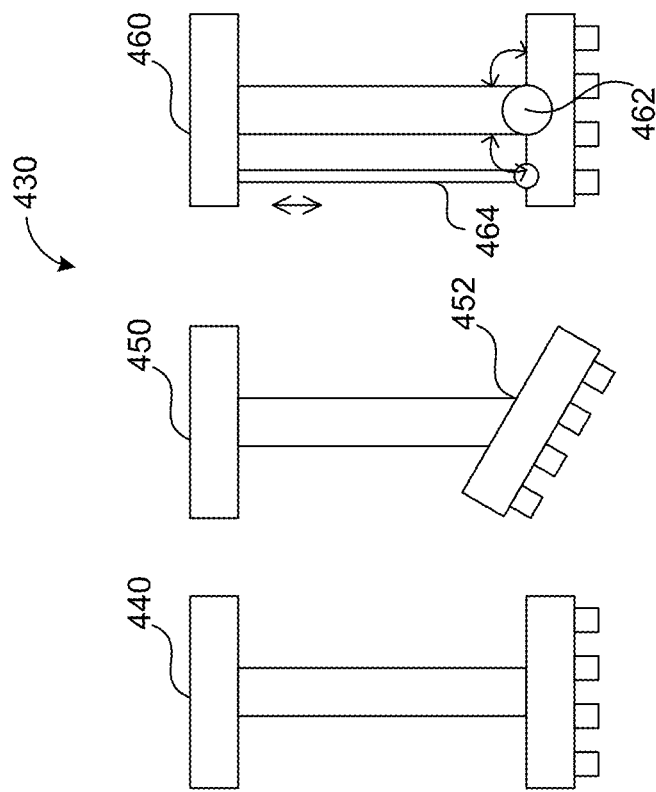
FIG. 4B is an illustration of an example tool set in accordance with one or more embodiments of the present technology.
Figure 4A:
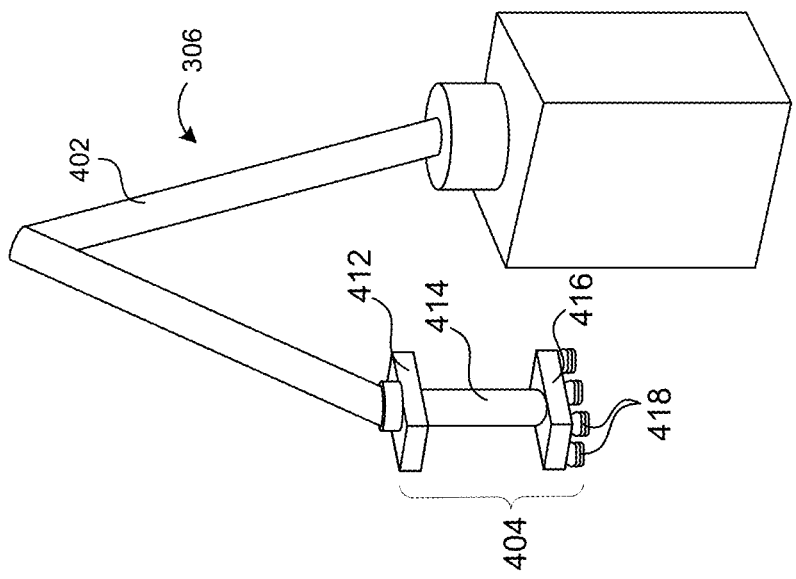
FIG. 4A is an illustration of an example transfer unit in accordance with one or more embodiments of the present technology.

FIG. 4A is an illustration of an example transfer unit (e.g., the robotic arm 306) in accordance with one or more embodiments of the present technology. The robotic arm 306 can be the transfer unit 104 of FIG. 1 (e.g., a piece-picker or a bin picker robot) or a portion thereof. The robotic arm 306 can include an arm portion 402 configured to maneuver an end-effector (e.g., a gripper) across an operating space. The arm portion 402 can include a set of structural members (e.g., beams, columns, etc.), a set of joints between structural members, and/or a corresponding set of actuators/motors configured to move the set of structural members about the joints.

An end-effector tool 404 can be attached to the arm portion 402, such as at a distal end thereof. The end-effector tool 404 can include a tool connector 412 (e.g., a selectively locking/attaching mechanism) configured to interface with and attach the tool to the arm portion 402. The tool connector 412 can be structurally connected to or integral with a tool arm 414 having the end-effector attached at an opposing end. For the example illustrated in FIG. 4A, the end-effector can include a gripper configured to grasp an object for manipulation (e.g., transfer or displacement across space). The gripper end-effector can include a gripper head 416 that houses or facilitates a grip interface 418 (e.g., a set of suction cups for a vacuum-based gripper). The grip interface 418 can be used to create an attachment force or mechanism (e.g., vacuum) that attaches the targeted object to the gripper head 416 and/or the robotic arm 306.

FIG. 4B is an illustration of an example tool set 430 in accordance with one or more embodiments of the present technology. The tool set 430 can represent the tools available to the robotic system 100 of FIG. 1 for performing one or more tasks. In some embodiments, the tool set 430 can include a standard-fixed gripping tool 440, a fixed-angle gripping tool 450, and/or an adjustable gripping tool 460. Although not shown in FIG. 4B, it is understood that the tool set 430 can include other tools, such as finger-based pinch grippers, grippers with different types of suction/contact interfaces, different categories of end-effectors (e.g., non-gripping end-effectors, such as for welding or cutting), or the like.

The standard-fixed gripping tool 440 can be configured to grasp objects placed relatively flat in comparison to a floor of the start bin 322. For example, the standard-fixed gripping tool 440 can include a laterally-oriented grip interface 418 for grasping laterally-oriented top surfaces of objects. The joint connecting the tool arm 414 and the gripper head 416 can be fixed with the tool arm 414 extending orthogonal to a suction interface or parallel to a pincher interface.

The fixed-angle gripping tool 450 can be configured to grasp objects placed at an angle in comparison to a floor of the start bin 322. For example, the fixed-angle gripping tool 450 can include the suction grip interface 418 and the tool arm 414 configured at a non-orthogonal angle for grasping non-lateral top surfaces of objects. An angled joint 452 can connect the tool arm 414 and the gripper head 416 in a fixed manner with the structures forming the corresponding non-orthogonal angle or orientations.

The adjustable gripping tool 460 can be configured to adjust the orientation of the gripper head 416 to the tool arm 414. For example, the adjustable gripping tool 460 can include an orientation control mechanism 464, such as a manipulation arm, a set of cables, actuators, motors, etc., configured to adjust the orientation of the gripper head relative to the tool arm 414 and about a rotatable joint 462. Accordingly, the robotic system 100 can operate the orientation control mechanism 464 to adjust the pose or orientation of the grip interface 418 according to the orientation of the targeted object or one or more portions thereof (e.g., the exposed top surface).

Example Tool Usage

FIG. 5A is an illustration of a standard grasp scenario 500 in accordance with one or more embodiments of the present technology. The standard grasp scenario 500 can be for gripping flat-posed objects 502. The flat-posed objects 502 can correspond to the targeted objects having an orientation (e.g., a bottom surface of the object) parallel to a bottom surface of the start bin 322. Accordingly, the standard grasp scenario 500 can correspond to the standard-fixed gripping tool 440. For example, the robotic system 100 of FIG. 1 can operate the robotic arm 306 of FIG. 3 to position the standard-fixed gripping tool 440 directly over the flat-posed object 502 and lower the end-effector to grip the object.

FIG. 5B is an illustration of an angled grasp scenario 510 in accordance with one or more embodiments of the present technology. The angled grasp scenario 510 can be for gripping angled object 512. The angled object 512 can include objects leaning or resting on uneven contact points (e.g., resting along a non-horizontal plane) and/or objects having non-parallel opposing surfaces. In some embodiments, the angled object 512 can correspond to objects with poses having one or more surfaces oriented along angled directions/planes relative to horizontal/vertical reference directions. Accordingly, the angled grasp scenario 510 can correspond to the fixed-angle gripping tool 450. For example, the robotic system 100 of FIG. 1 can operate the robotic arm 306 of FIG. 3 to position the fixed-angle gripping tool 450 directly over the angled object 512 and lower the end-effector to grip the object.

For comparison, the standard-fixed gripping tool 440 may not be appropriate for the angled grasp scenario 510. For example, to grip the angled object 512, the standard-fixed gripping tool 440 may be tilted or angled such that the grip interface 418 is oriented parallel to interfacing portions of the angled object 512. Lowering the standard-fixed gripping tool 440 as tilted may cause a collision event (illustrated by 'X' in FIG. 5B) between the tool and/or the robotic arm 306 and the start bin 322.

In some embodiments, the robotic system 100 can select the fixed-angle gripping tool 450 based on a surface pose 514 for the angled object 512. For example, the robotic system 100 can process one or more images (e.g., top view images) of the start bin 322 and/or the angled object 512 therein as captured by the imaging devices 222 of FIG. 2. The robotic system 100 can identify the edges depicted in the images based on an edge detection mechanism (e.g., Sobel filter). The robotic system 100 can identify each continuous surface depicted in the images based on determining connections and/or relative orientations between a set of edges and/or recognizing shapes, colors, and/or designs located between the edges. The robotic system 100 can map the surfaces to three-dimensional images (e.g., depth maps) and calculate one or more slopes for each surface using the depth measures. Using the calculated slope(s), the robotic system 100 can derive the surface pose 514 of each surface. The robotic system 100 can determine the angled object 512 based on comparing the surface pose 514 to thresholds that represent horizontal or flat surfaces.

FIG. 6A is an illustration of a standard release scenario 600 in accordance with one or more embodiments of the present technology. The standard release scenario 600 can be for releasing the grasped object (e.g., the target object 112 of FIG. 1) from the standard-fixed gripping tool 440. The standard release scenario 600 can be for placing the grasped object (e.g., the target object 112 of FIG. 1) at the corresponding placement location at the task location 116 and/or in the target container 324 of FIG. 3. The standard release scenario 600 can correspond to a flat placement of the grasped object and/or an upright orientation of the standard-fixed gripping tool 440.

FIG. 6B is an illustration of a first angled release scenario 610 in accordance with one or more embodiments of the present technology. The first angled release scenario 610 can be for releasing the grasped object (e.g., the target object 112 of FIG. 1) from the fixed-angle gripping tool 450. The first angled release scenario 610 can be for placing the grasped object (e.g., the target object 112 of FIG. 1) at the corresponding placement location at the task location 116 and/or in the target container 324 of FIG. 3. The first angled release scenario 610 can correspond to a flat placement pose 612 of the grasped object. Accordingly, the robotic system 100 of FIG. 1 can orient the fixed-angle gripping tool 450 to an angled tool release pose 614 (e.g., a non-vertical or a tilted orientation of the tool arm therein). The tool release pose 614 can correspond to the angled joint 452 of FIG. 4B of the fixed-angle gripping tool 450.

FIG. 6C is an illustration of a second angled release scenario 620 in accordance with one or more embodiments of the present technology. The second angled release scenario 620 can be for releasing the grasped object (e.g., the target object 112 of FIG. 1) from the fixed-angle gripping tool 450. The second angled release scenario 620 can be for placing the grasped object (e.g., the target object 112 of FIG. 1) at the corresponding placement location at the task location 116 and/or in the target container 324 of FIG. 3. The second angled release scenario 620 can correspond to an angled placement pose 622 of the grasped object. Accordingly, the robotic system 100 of FIG. 1 can orient the fixed-angle gripping tool 450 to an upright tool release pose 624 (e.g., a vertical orientation of the tool arm therein). The angled placement pose 622 can correspond to the angled joint 452 of FIG. 4B of the fixed-angle gripping tool 450. The angled placement pose 622 and the upright tool release pose 624 can be for releasing the grasped object without implementing orientation maneuvers associated with the tool release pose 614 and the flat placement pose 612 illustrated in FIG. 6B. Accordingly, the angled placement pose 622 and the upright tool release pose 624 can correspond to lower implementation costs (e.g., shorter implementation time) than the tool release pose 614 and the flat placement pose 612. The angled placement pose 622 and the upright tool release pose 624 can be implemented for objects having predetermined characteristics, such as for softer and/or more flexible objects that are less susceptible to damage from impact.

Example Task Timings

Figure 7:
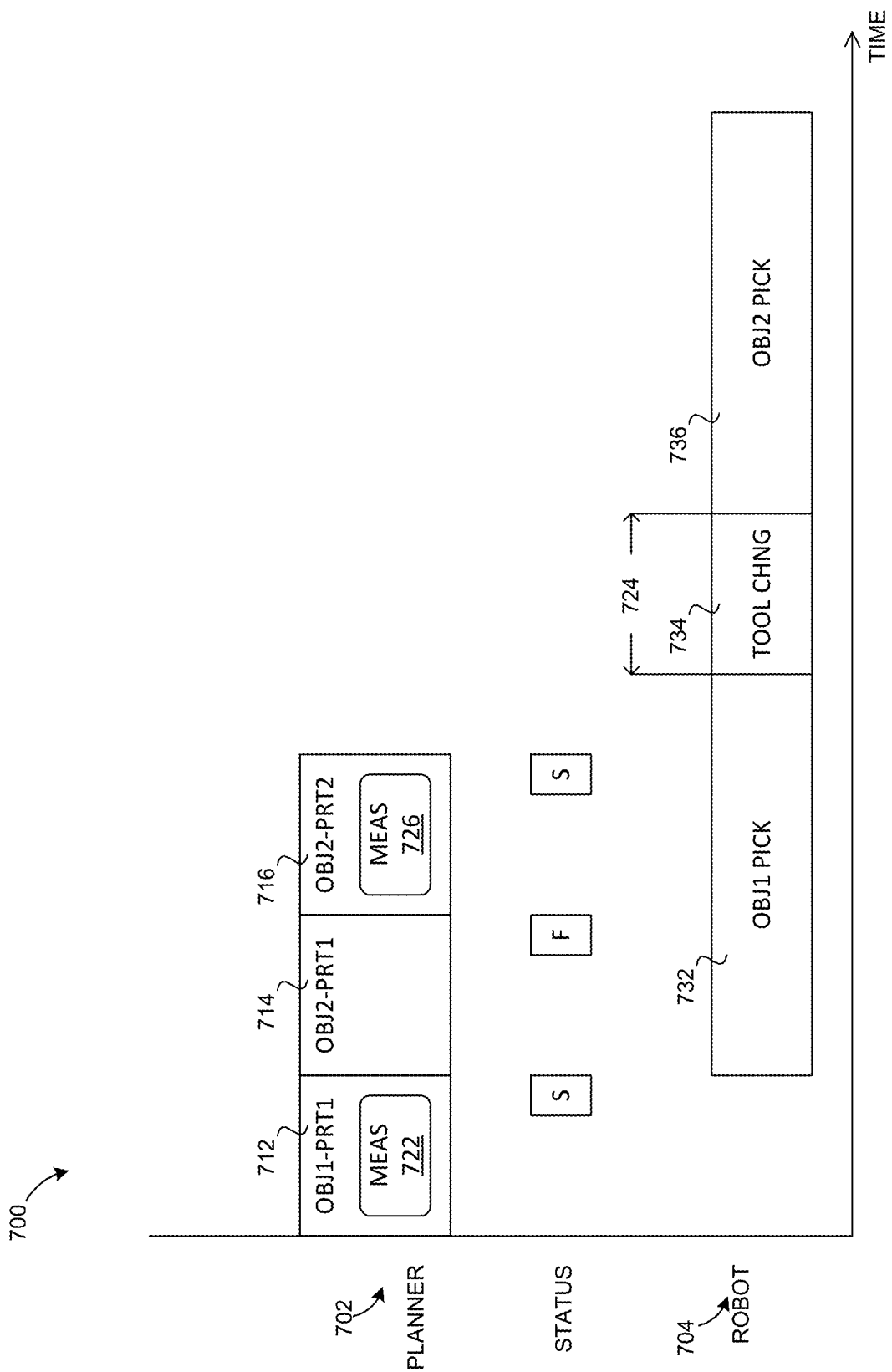
FIG. 7 is an example timing diagram in accordance with one or more embodiments of the present technology.

FIG. 7 is an example timing diagram 700 in accordance with one or more embodiments of the present technology. The timing diagram 700 can represent a sequence or a temporal relationship between operations and/or processes for the robotic system 100 of FIG. 1 (e.g., the system manager 302 of FIG. 3, the planner 304 of FIG. 3, and/or the robotic arm 306 of FIG. 3). For example, the timing diagram 700 can illustrate a temporal relationship between a planning schedule 702 and an implementation schedule 704. The planning schedule 702 can represent a sequence of processes that each derive an instance of the transfer plan 314 of FIG.

3, such as for transferring a targeted object with an assigned tool as specified by the target selection 313 of FIG. 3. The implementation schedule 704 can represent a sequence of plan implementations/executions at/by the robotic arm 306.

The robotic system 100 can conduct the plan derivation process and the plan implementation process in parallel to increase overall efficiency and reduce the overall task execution time. For the example illustrated in FIG. 7, the system manager 302 can send a first object selection (e.g., an instance of the target selection 313) identifying object-1 to be grasped and transferred using part-1 (e.g., the standard-fixed gripping tool 440 of FIG. 4B). In response to the first object selection, the planner 304 can derive a first-object plan 712 for grasping and transferring the object-1 with the part-1. Upon successful derivation, the planner 304 can communicate the first-object plan 712 to the system manager 302 through the corresponding feedback 318 of FIG. 3, and the system manager 302 can interact with the robotic arm 306 to implement the first-object plan 712. A first-object transfer 732 of the implementation schedule 704 can represent the implementation of the first-object plan 712 at the robotic arm 306.

Also, upon successful derivation, the system manager 302 can send a second object selection (a new instance of the target selection 313) identifying object-2 to be grasped and transferred using connected part-1. In response to the second object selection, the planner 304 can derive a second-object plan 714, such as using an example iterative process described above. When the second object is the angled object 512 of FIG. 5B, the planner 304 can return a failure status representative of an inability to derive a successful plan, such as due to an estimated collision event in attempting to grasp the object. The planner 304 can communicate the failure status to the system manager 302, such as through the corresponding feedback 318. In some embodiments, the system manager 302 can identify other targeted objects to be considered for planning with the currently connected tool. The system manager 302 can identify the second object for planning with an update tool selection (e.g., the fixed-angle gripping tool 450 of FIG. 4B and/or an alternative head angle for the adjustable gripping tool 460 of FIG. 4B), such as when none of the remaining objects can be grasped with the currently connected tool and/or gripper head orientation. With the updated tool, the planner 304 can derive an updated second-object plan 716. A second-object transfer 736 of the implementation schedule 704 can represent the implementation of the updated second-object plan 716 at the robotic arm 306. The various planning processes can take place parallel to (e.g., independent of) the implementation schedule 704.

Upon successfully deriving a subsequent plan, the system manager 302 can queue the implementation thereof in the implementation schedule 704. When the successful derivation is based on providing an updated tool in the target selection 313, such as for the updated second-object plan 716, the system manager 302 can include a tool change 734 in the implementation schedule 704.

In some embodiments, the robotic system 100 (at, e.g., the system manager 302 and/or the planner 304) can estimate implementation measures for the various implementations. For example, the robotic system 100 can derive a first plan measure 722 (e.g., a total execution time including picking and/or placing an object) for the first-object plan 712, a second plan measure 726 for the updated second-object plan 716, and/or a tool change measure 724 (e.g., a maximum and/or an average time required) for the tool change 734. The robotic system 100 can use the implementation measures to derive a plan sequence that minimizes a combined measure. In some embodiments, the tool change measure 724 can represent the cost associated with switching a pose of the grip interface 418 on the adjustable gripping tool 460 between functioning as the standard-fixed gripping tool 440 and the fixed-angle gripping tool 450. The tool change measure 724 can further include or account for the cost (e.g., time and/or changes in failure estimates) associated with achieving the tool release pose 614 (e.g., additional maneuvers in comparison to the standard release from the standard-fixed gripping tool). Also, the tool change measure 724 can further include or account for the cost associated with the change in drag or air resistance associated with changes in surface area relative to a direction of movement, such as due to angled grips, and/or additional maneuvers to reduce the drag.

As an illustrative example, the robotic system 100 can derive the planning schedule 702 for transferring a plurality of objects from the start location (e.g., a bin) to the target location (e.g., a different bin or a conveyor). The robotic system 100 can derive the estimate implementation measures for transferring one or more of the objects using corresponding tools. The estimated measures can account for any speed changes, additional maneuvers and/or adjusted picking/dropping maneuvers or poses for the different tools. In some embodiments, the estimated measures can further account for an expected error rate associated with the corresponding object-tool combination. For example, the estimated measure can include the transfer time increased by a calculated amount to account for remedial actions that will be deployed in case of an error (e.g., piece loss). The additional adjustment can be calculated based on weighing an average duration of the remedial actions by an error rate associated with the object-tool combination and/or corresponding movement setting (e.g., speed). Accordingly, the robotic system 100 can balance (1) any negative adjustments for utilizing a sub-optimal tool to transfer an object against (2) the cost of changing the tool to use the optimal tool to transfer the object and the impact of the tool change in transferring other objects. Thus, the robotic system 100 can evaluate the overall costs of different combinations of motion plans and select one that minimizes the costs in transferring one or more or all of the targeted objects. In some embodiments, the estimated measure can be represented as picks per minute or hour using the same robotic unit.

Operational Flow

Figure 8:
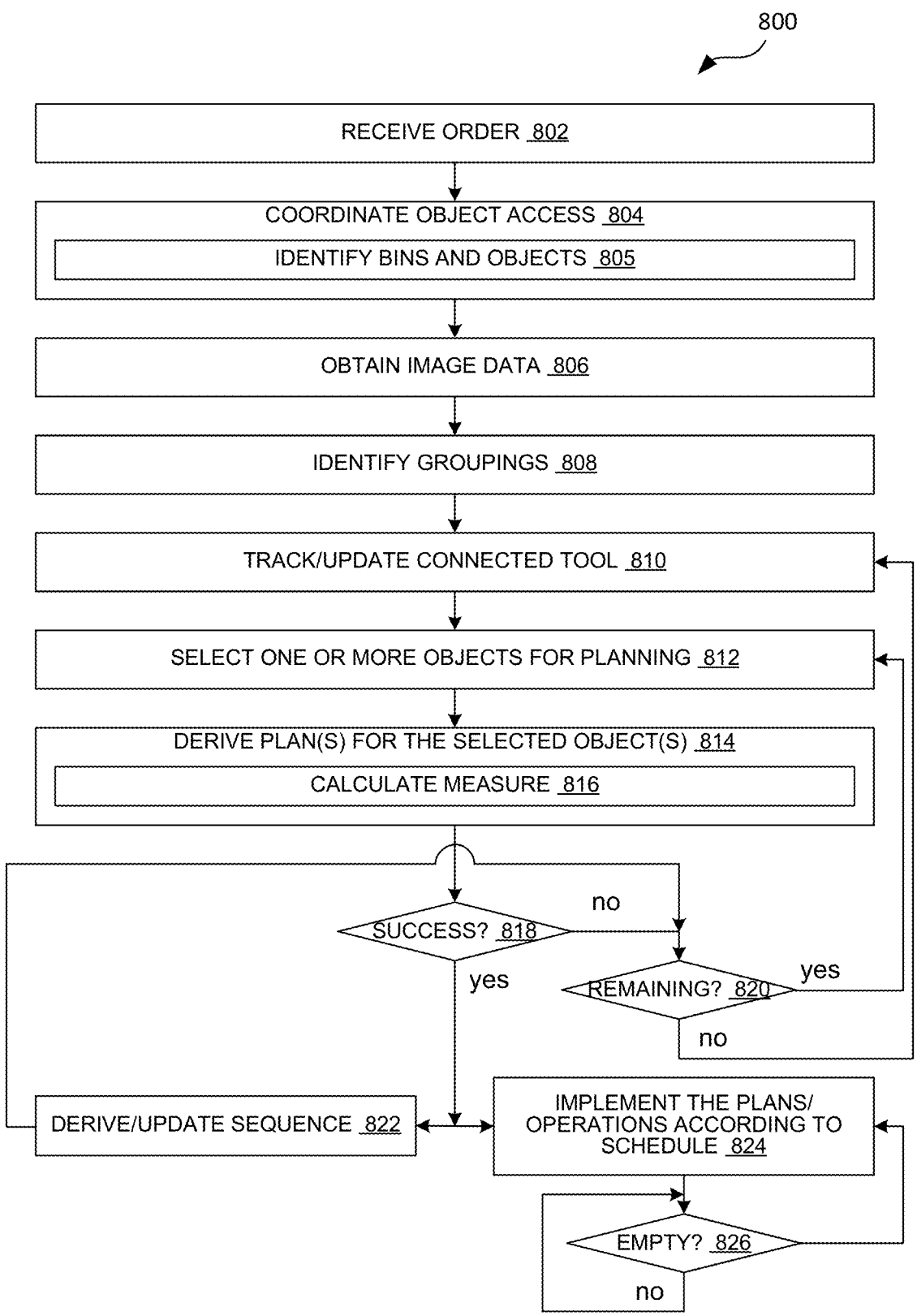
FIG. 8 is a flow diagram for operating a robotic system in accordance with some embodiments of the present technology.

FIG. 8 is a flow diagram of a method 800 for operating a robotic system (e.g., the robotic system 100 of FIG. 1) in accordance with one or more embodiments of the present disclosure. The method 800 can be implemented using one or more of the devices described above, such as the system manager 302 of FIG. 3, the planner 304 of FIG. 3, and/or the robotic arm 306 of FIG. 3. The method 800 can be implemented using one or more of the components described above, such as the processors 202 of FIG. 2, the storage devices 204 of FIG. 2, etc. The method 800 can be for planning and implementing tasks (e.g., transferring objects) using a set of tools (e.g., the tool set 430 of FIG. 4B). As described in detail below, the method 800 can correspond to planning and implementing the tasks in parallel and/or processing the objects in groups according to appropriate tools for minimizing the tool change 734 of FIG. 7.

At block 802, the robotic system 100 can receive an order (e.g., the order input 312 of FIG. 3) for a set of items. For example, the robotic system 100 (via, e.g., the communication devices 206 of FIG. 2) can receive the order input 312 from a customer or a requesting warehouse. Also, the order input 312 can correspond to an internally-generated order to repackage or re-group the items for storage, such as to rearrange/combine objects and reduce storage containers. Accordingly, the robotic system 100 can identify a set of objects that are required to be moved from a storage location to a different location (e.g., an outgoing container) to fulfill the order.

At block 804, the robotic system 100 can coordinate access for the ordered objects. The robotic system 100 (via, e.g., the system manager 302 of FIG. 3) can identify the storage location(s) of the ordered objects. For example, the robotic system 100 can compare the order input 312 to a record of stored/accessible objects. Accordingly, the robotic system 100 identify bins and/or objects corresponding to the order input 312 as illustrated at block 805. The robotic system 100 can determine the storage locations and/or identifiers of containers that have the ordered objects stored therein.

The robotic system 100 can use the determined locations and/or container identifiers to coordinate access for the ordered objects. For example, the robotic system 100 can directly operate one or more transport units (e.g., AGVs and/or conveyors) to transport the targeted container(s) from the storage location(s) to the start location 114 of FIG. 1 for the robotic arm 306 of FIG. 3. The robotic system 100 can similarly operate the transport units to transport the target container 324 of FIG. 3 from its storage location to the task location 116 of FIG. 1. Additionally or alternatively, the robotic system 100 can interact or communicate with one or more subsystems (e.g., a storage access system) to place the targeted container(s) and/or the target container 324 at their respective locations.

At block 806, the robotic system 100 can obtain image data. For example, the robotic system 100 can use the imaging devices 222 of FIG. 2 to obtain a two-dimensional and/or a three-dimensional image depicting the storage container at the start location. Accordingly, the obtained image data can depict in real-time one or more of the ordered objects stored within the storage container.

At block 808, the robotic system 100 can identify groupings of objects (e.g., targeted or ordered objects) in the storage container. The robotic system 100 can process the obtained image data to detect or recognize the objects within the start bin 322. For example, the robotic system 100 can identify surfaces based on detecting lines (via, e.g., Sobel detection mechanism) and connections/arrangements between the detected lines. The robotic system 100 can compare the depicted image or portions thereof (e.g., portions within the surfaces) to surface image data in the master data. Additionally or alternatively, the robotic system 100 can compare dimensions of the identified surfaces to object dimensions stored in the master data. The robotic system 100 can identify the objects based on matches for the depicted image and/or the measured dimension with the corresponding image and/or predetermine dimension stored in the master data.

The robotic system 100 can compare the identified set of objects in the start bin 322 to the targeted or expected portion of the order input 312. Accordingly, the robotic system 100 can locate the targeted objects in the start bin 322. The robotic system 100 can further process the targeted objects to classify/group the objects according to the tool set 430, thereby determining the tool-based object groupings 316 of FIG. 3. For example, the robotic system 100 can determine whether each of the targeted objects are the flat-posed objects 502 of FIG. 5A or the angled object 512 of FIG. 5B. The robotic system 100 can use the depth measures associated with the depicted surfaces to calculate one or more slopes. The robotic system 100 can use the calculated slope to derive the surface pose 514 of FIG. 5B for each of the targeted objects. The surface pose 514 can be used to categorize or group the objects, such as the flat-posed objects 502, the angled object 512, or the like, according to the tool appropriate or assigned to manipulate the corresponding objects.

The robotic system 100 can further classify/group the objects according to other traits that correspond to the different end-effectors and/or the targeted task. For example, the robotic system 100 can group the objects according to structural rigidity and/or outer surface material (e.g., box, plastic wrapping, bags, etc.), overall shape, or the like associated with different types of grippers (e.g., different types of contact interfaces, such as suction grippers, suction cup sizes/locations, finger-based gripper, etc.). Also, the robotic system 100 can group the objects that are bound together, thereby requiring a cutting tool, separately from other unbound objects. Accordingly, the grouped objects can correspond to the tool-based object groupings 316.

As an illustrative example, the robotic system 100 can determine at least a first set of objects (e.g., the set of flat-posed objects 502) and a second set of objects (the set of angled object 512) based on the image data depicting objects within the start bin 322. The first set of objects can have one or more aspects (e.g., pose) that correspond to characteristics (e.g., angle/orientation of the grip interface 418) of a first tool, and the second set of objects can have one or more aspects that correspond to characteristics (e.g., angle/orientation of the grip interface 418) of a second tool. The flat-posed objects 502 can each have a top portion parallel to a bottom surface of the start bin 322, thereby corresponding to the standard-fixed gripping tool 440. The angled object 512 can each have a top portion surface pose forming an angle relative to the bottom surface of the start bin 322, thereby corresponding to the fixed-angle gripping tool 450.

At block 810, the robotic system 100 can track and/or update the connected tool. The robotic system 100 can use internal mechanisms (e.g., radio-frequency identification (RFID) circuit, hardcoded identifier, or the like) to dynamically detect the tool connected to the robotic arm 306. Additionally or alternatively, the robotic system 100 can track the tool change operations and the tool selections to track the connected tool.

In tracking and/or updating the connected tool, the robotic system 100 can access or determine the tool set available to the robotic system 100. For example, the robotic system 100 can access the predetermined data regarding tools and/or the corresponding characteristics (e.g., pose of the grip interface 418) for the tool set 430 available to the robotic arm 306. Additionally or alternatively, the robotic system 100 can dynamically track (e.g., in real time) the tools being used or connected to robotic units. Accordingly, the robotic system 100 can determine tools that are remaining (e.g., not connected to any other robotic units) and available for access/connection. The robotic system 100 can further access predetermined or previously-measured data to determine the tool change measure 724 of FIG. 7 (e.g., a cost, such as time) associated with switching between tools (e.g., disconnecting from one tool and connecting to a different tool) in manipulating the target object. In some embodiments, the tool change measure 724 can represent the cost associated with changing a pose for the grip interface 418 for the adjustable gripping tool 460, such as by manipulating the orientation control mechanism 464 of FIG. 4.

Also, at block 810, the robotic system 100 can update the connected tool, such as according to a status determination described below (e.g., decision block 820). For example, when a new tool is required to manipulate/transfer objects according to the status determination, the robotic system 100 can operate the robotic arm 306 to disconnect the connected tool and connect to a new tool appropriate for the subsequent transfers. The robotic system 100 can update the tracked tool information. In some embodiments, the robotic system 100 can schedule the tool update (e.g., the tool change 734) and update the tracked information when the tool change 734 is implemented.

At block 812, the robotic system 100 can select one or more objects for planning. The robotic system 100 can select from the grouping that corresponds to the tool connected to the robotic arm 306. Within the selected grouping, the robotic system 100 can iteratively select one object for transfer. The robotic system 100 can select based on a set of predetermined selection rules, such as for selecting higher-positioned objects and/or nearer-positioned objects first.

At block 814, the robotic system 100 (via, e.g., the planner 304) can derive one or more plans (e.g., the transfer plan 314) for the selection. For example, the system manager 302 can provide to the planner 304 the target selection 313 according to the selected object and/or the connected tool. In some embodiments, the robotic system 100 can provide a list of objects for one group. In response, the planner 304 can derive one or more transfer plans for each object. When the plan derivation is successful, the planner 304 can provide to the system manager 302 the resulting transfer plan 314 through the feedback 318. Otherwise, when the plan derivation is unsuccessful (due to, e.g., estimated collisions caused by improper tool assignments), the planner 304 can provide the feedback 318 reporting the unsuccessful status (e.g., an indication of improper matching between the assigned tool and the targeted object).

Accordingly, the robotic system 100 can derive a set of the transfer plans 314 for transferring the targeted objects according to the tools. In some embodiments, for example, the robotic system 100 can follow a process for planning the transfers based on the tool change measure 724 (according to, e.g., a set of rules and/or an architecture for minimizing the overall transfer cost/time). For systems where the tool changes have greater average/maximum measure than that of planning processes and/or plan implementations, the robotic system 100 can plan the transfers to minimize the tool changes. As an example, the robotic system 100 can plan and schedule implementations thereof for applicable objects/grouping using a connected tool before planning for a different group of objects. In some embodiments, the robotic system 100 can iteratively conduct the selection and derivation process and implement the derived plans accordingly. In other embodiments, the robotic system 100 can derive plans for one or more groupings of objects and arrange/sequence the plans according a set of rules for minimizing the overall cost.

In deriving the plan, the robotic system 100 can calculate a measure (e.g., the plan measure 720 of FIG. 7) as illustrated at block 816. For example, the robotic system 100 can calculate an estimated duration for each transfer plan based on a calculated travel distance, a number and/or types of maneuvers, corresponding settings, or the like.

For the example illustrated in FIG. 8, the robotic system 100 can derive a set of plans based on iteratively selecting and planning for objects in one grouping before processing another grouping. At decision block 818, the planner 304 can determine whether or not the planning derivation is successful and provide the corresponding feedback 318 to the system manager 302. When the planning derivation is not successful, the robotic system 100 can determine whether any objects are remaining in the currently processed object grouping, such as illustrated at decision block 820. When objects remain in the currently selected/processed grouping, the flow can proceed to block 812, and the robotic system 100 can select the next object in the grouping. When no more objects remain in the grouping (e.g., the tool-based object grouping 316 is empty), the flow can pass to block 810, and the robotic system 100 can update the connected tool (by, e.g., perform the tool change 734). The robotic system 100 can select and connect to the new tool according to the remaining objects in the bin and the corresponding tool(s). Along with the tool change, the robotic system 100 can derive plans for a different grouping associated with the new tool.

In some embodiments, when the planner 304 derives a plan, the robotic system 100 can derive and/or update a sequence for implementing the plans. For example, the system manager 302 can schedule implementation of the plan, such as by queuing the plans at the system manager 302 or the robotic arm 306.

In one or more alternative embodiments, the robotic system 100 can derive multiple plans for each object (e.g., one for each available tool). At block 822, the robotic system 100 can derive a sequence/combination of the plans based on the corresponding plan measures and the tool change measure 724. The robotic system 100 can select and schedule the sequence having the lowest overall cost (e.g., overall implementation/transfer time).

As an illustrative example of blocks 808-822, the robotic system 100 can identify a first tool (e.g., the standard-fixed gripping tool 440) connected to the robotic arm 306 before transferring the set of targeted objects in the start bin 322. The robotic system 100 can determine and select a first object set (e.g., an instance of the tool-based object grouping 316, such as the flat-posed objects 502) that corresponds to the first tool. The robotic system can iteratively derive a first set of plans for operating the robotic arm 306 to transfer the first set of objects. In some embodiments, the robotic system 100 can derive the first set of plans based on selecting an object in the set, deriving a test plan for the selected object, and determining whether the test plan is feasible for implementation. After deriving the first set of plans, the robotic system 100 can schedule the tool change 734 to follow the last plan in the first set. Accordingly, the robotic system 100 can schedule for a second tool (e.g., the fixed-angle gripping tool 450) to be connected to the robotic arm 306 after transferring the first set of objects. The robotic system 100 can continue deriving plans for the second set of objects.

At block 824, the robotic system 100 (via, e.g., the system manager 302) can implement the scheduled plans. In other words, the robotic system 100 can operate the robotic arm 306 and transfer the objects according to the derived transfer plans and their scheduled sequence. The plans can be implemented parallel to (e.g., independent of) the subsequent derivation process. For example, the system manager 302 can initiate the implementation of the first plan at the robotic arm 306 immediately before or after providing the target selection 313 to the planner 304 to initiate plan derivation for the second object. Accordingly, the derivation process for the second object or any subsequent objects can occur while the robotic arm 306 transfer the first object.

Thus, the robotic system 100 can continuously derive and implement the motion plans until the start location or the targeted set of object is empty as illustrated at block 826.

In some embodiments, the robotic system 100 can include in the transfer plans operations for reducing tension for the orientation control mechanism 464 of the adjustable gripping tool 460. The robotic system 100 can include the corresponding commands and/or settings (1) after contacting a corresponding object with at least a portion of the grip interface and/or (2) before gripping the corresponding object. Accordingly, during implementation, the grip interface 418 can shift and/or rotate and increase the contact area with the exposed surface of the targeted object. In other words, the grip interface 418 can rotate or adjust about the rotatable joint 162 and match the surface pose 514 of the targeted object. The reduced tension can occur before or during activation of the grip interface 418 (e.g., suction cups) so as to improve the grip established between the grip interface 418 and the targeted object.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

What is claimed is:

1. A method for operating a robotic system, the method comprising:
    obtaining image data representing one or more available objects at a start location;
    deriving, based on the image data, a set of plans including at least a first plan and a second plan, wherein:
        the first plan is for causing transfer of a target object of the available object(s) from the start location to a target location using a first tool, and
        the second plan is for causing transfer of the target object of the available object(s) from the start location to the target location using a second tool;
    calculating one or more cost measure for each of the first plan and the second plan, wherein the cost measure includes an estimated manipulation error parameter associated with manipulating the target object utilizing the corresponding first tool or second tool; and
    selecting a transfer plan from the first plan and the second plan based on the cost measure, wherein the selected transfer plan corresponds to a lower cost measure.

2. The method recited in claim 1, wherein the estimated manipulation error parameter is an estimated transfer error parameter associated with transferring the target object utilizing the corresponding first tool or second tool.

3. The method recited in claim 2, wherein the estimated transfer error parameter includes an estimate of whether the target object will be dropped during transfer.

4. The method recited in claim 2, wherein the estimated transfer error parameter includes an estimate of the movement speed of the target object and/or corresponding first or second tool during transfer.

5. The method recited in claim 4, wherein the estimate of the movement speed is based on a gripping confidence parameter corresponding to a grip sufficiency of the target object.

6. The method recited in claim 1, wherein:
    the calculating one or more cost measure step further includes calculating a second cost measure for recovering from a transfer error;
    the calculating one or more cost measure step further includes calculating a third cost measure for changing from the first tool to the second tool, or vice versa; and
    the selecting the transfer plan step includes selecting the transfer plan that lowers the total combination of the cost measure, second cost measure, and third cost measure.

7. The method recited in claim 1, wherein:
    the calculating one or more cost measure step further includes calculating a second cost measure for changing from the first tool to the second tool, or vice versa; and
    the selecting the transfer plan step includes selecting the transfer plan that lower the lowers the total combination of the cost measure and the second cost measure.

8. The method recited in claim 2, wherein the estimated transfer error parameter includes an estimate of a timing and/or a complexity of movements for transferring the target object.

9. The method recited in claim 1, wherein the estimated manipulation error is an estimated placement error parameter associated with placing the target object at the target location utilizing the corresponding first tool or second tool.

10. The method recited in claim 9, wherein the estimated placement error parameter includes an estimate of a release pose of the target object and/or includes an estimate of an orientation of the target object at a time of release.

11. The method recited in claim 1, wherein:
the calculating one or more cost measure step includes calculating a second cost measure for each of the first plan and the second plan, wherein the second cost measure includes a timing and/or a complexity of movements for achieving a release pose; and
the selected transfer plan corresponds to the lower cost measure of the total of the cost measure and the second cost measure.

12. The method recited in claim 1, wherein the estimated manipulation error is an estimated grasping error parameter associated with grasping the target object at the start location utilizing the corresponding first tool or second tool.

13. The method recited in claim 12, wherein the estimated grasping error parameter further includes an estimate of the corresponding first tool or second tool colliding with another object or an environmental object before grasping the target object.

14. The method recited in claim 1, wherein:
the calculating one or more cost measure step further includes calculating a second cost measure for changing between the first tool and the second tool, or vice versa; and
the selecting the transfer plan step includes selecting the transfer plan that lowers the total combination of the cost measure and the second cost measure.

15. A tangible, non-transitory computer-readable medium having processor instructions stored thereon that, when executed by one or more processors, cause the one or more processors to perform a method, the method comprising:
obtaining image data representing one or more available objects at a start location;
deriving, based on the image data, a set of plans including at least a first plan and a second plan, wherein:
the first plan is for causing transfer of a target object of the available object(s) from the start location to a target location using a first tool, and
the second plan is for causing transfer of the target object of the available object(s) from the start location to the target location using a second tool;
calculating one or more cost measure for each of the first plan and the second plan, wherein the cost measure includes an estimated manipulation error parameter associated with manipulating the target object utilizing the corresponding first tool or second tool;
selecting a transfer plan from the first plan and the second plan based on the cost measure, wherein the selected transfer plan corresponds to a lower cost measure.

16. The tangible, non-transitory computer-readable medium of claim 15, wherein the estimated manipulation error parameter is an estimated transfer error parameter associated with transferring the target object utilizing the corresponding first tool or second tool.

17. The tangible, non-transitory computer-readable medium of claim 15, wherein the estimated manipulation error is an estimated placement error parameter associated with placing the target object at the target location utilizing the corresponding first tool or second tool.

18. A robotic system comprising:
at least one processor coupled to the communication circuit and configured to:
obtain image data representing one or more available objects at a start location;
derive, based on the image data, a set of plans including at least a first plan and a second plan, wherein:
the first plan is for causing transfer of a target object of the available object(s) from the start location to a target location using a first tool, and
the second plan is for causing transfer of the target object of the available object(s) from the start location to the target location using a second tool;
calculate one or more cost measure for each of the first plan and the second plan, wherein the cost measure includes an estimated manipulation error parameter associated with manipulating the target object utilizing the corresponding first tool or second tool;
select a transfer plan from the first plan and the second plan based on the cost measure, wherein the selected transfer plan corresponds to a lower cost measure; and
a communication circuit configured to communicate the selected transfer plan.

19. The system of claim 18, wherein the estimated manipulation error parameter is an estimated transfer error parameter associated with transferring the target object utilizing the corresponding first tool or second tool.

20. The system of claim 18, wherein the estimated manipulation error is an estimated placement error parameter associated with placing the target object at the target location utilizing the corresponding first tool or second tool.

* * * * *